United States Patent [19]

Kerr et al.

[11] 3,739,326
[45] June 12, 1973

[54] HYDROPHONE ASSEMBLY
[75] Inventors: Wayne L. Kerr; Thomas W. Duggan, both of Houston, Tex.; Billy W. Davis, Flagstaff, Ariz.
[73] Assignee: Schlumberger Technology Corporation, New York, N.Y.
[22] Filed: July 26, 1971
[21] Appl. No.: 166,251

[52] U.S. Cl.................. 340/7 R, 340/3 T, 340/10, 340/17, 310/9.1
[51] Int. Cl............................................. G01v 1/38
[58] Field of Search................ 340/3 T, 7 PC, 7 R, 340/8 S, 10, 17; 310/9.1

[56] References Cited
UNITED STATES PATENTS
3,509,522   4/1970   Whitfill, Jr........................... 340/10
3,444,508   5/1969   Granfors et al....................... 340/10

Primary Examiner—Samuel W. Engle
Assistant Examiner—N. Moskowitz
Attorney—Ernest R. Archambeau, Jr., David L. Moseley, Edward M. Roney and William R. Sherman

[57] ABSTRACT

A hydrophone assembly for use in a marine streamer having a cable core includes a piezoelectric crystal in the form of cylinder that is mounted in concentric relation on the cable core by cap assemblies. Each cap assembly is formed in two separate halves that can be fitted together and sealed with respect to the cylinder and core after the crystal is in place and has been connected to the electrical conductors inside the core.

7 Claims, 3 Drawing Figures

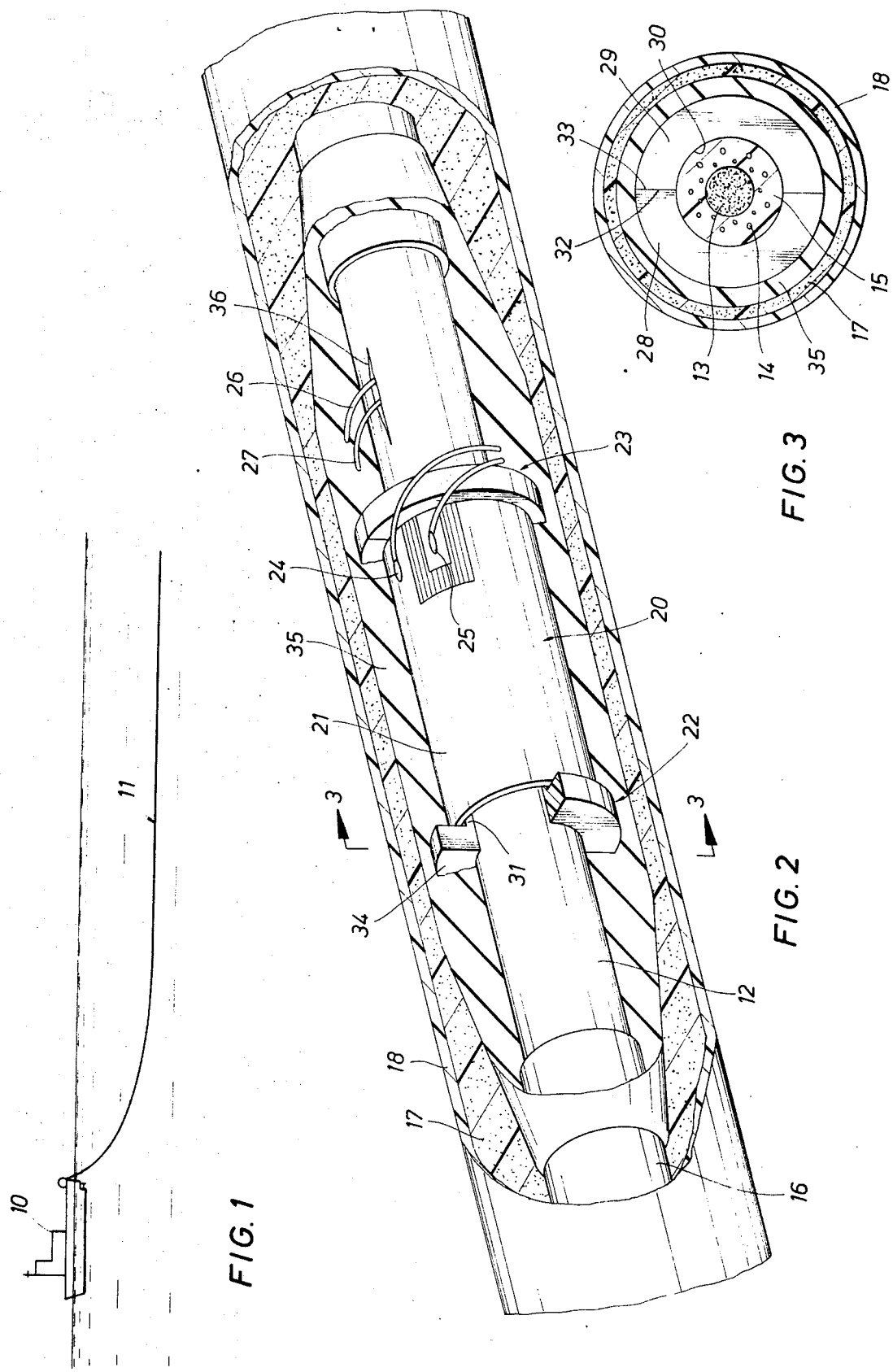
Patented June 12, 1973
3,739,326

HYDROPHONE ASSEMBLY

This invention relates generally to marine streamer cables used in seismic exploration, and more particularly to a new and improved hydrophone transducer assembly for use in such cables.

In marine seismic exploration, a long streamer cable is towed through water behind a boat. The cable has transducers spaced at desired points or intervals along its length and connected by electrical conductors to suitable signal processing and recording equipment onboard the tow boat. Acoustic wave energy is provided in the vicinity of the cable by typical devices well known to those skilled in the art, and the wave energy travels downwardly through the earth. At levels where there is a contrast in velocity propagation characteristics of the earth stratum, a portion of the wave energy is reflected upwardly. The upwardly traveling seismic reflections produce acoustic pressure waves in the water and these waves cause the transducers to respond. In this manner it is possible to map the geological strata underlying the sea bottom.

For this type of cable, it is fairly common to have transducers in the form of piezoelectric crystal cylinders that are slipped onto the cable core for assembly. To provide an air gap underneath each cylinder, it is made with a larger internal diameter than the outer diameter of the core, and a pair of doughnut shaped end caps are used to mount the cylinder concentrically on the core. In order to preserve the air gap, it is necessary to have a close tolerance fit for each end cap on the core so that it can be sealed with respect to both the core and the cylinder by a suitable adhesive. However, the close tolerance requirement has made the assembly of such hydrophones very difficult because of the necessity for slipping the end caps over the core along with the cylinders. If there are variations in core diameter (which is quite commonly the case) the caps would have to be bored out to a larger diameter and fitted to the core through the use of shims, a procedure which further complicated the assembly. Also, the requirement for slipping the caps over the core and into position with the cylinders has made the wiring of electrical connections difficult, primarily because at least one of the end caps for each cylinder is in the way during such wiring. Due to the large number of crystals commonly used in each cable section, the cumulative magnitude of the foregoing assembly problems is sizable, resulting in increased manufacturing cost.

Another problem that has existed in the prior art is due to inadequate protection afforded the inherently fragile crystal cylinders and the probability of breakage during reeling operations or if the cable is not handled carefully by boat personnel. Of course such breakage will render the crystal inoperative, or at the least will reduce its sensitivity to an unacceptable level.

An object of the present invention is to provide a new and improved hydrophone assembly that is constructed of easily assembled parts.

Another object of the present invention is to provide a new and improved hydrophone assembly with reduced cost compared to prior devices.

Yet another object of the present invention is to provide a new and improved hydrophone assembly that is constructed and arranged to substantially minimize the possibility of accidental breakage.

These and other objects are attained in accordance with the concepts of the present invention by a hydrophone assembly comprising a piezoelectrical crystal in the form of a cylinder that is sized to be slipped over a cable core containing electrical conductors to which the crystal is to be connected. The cylinder is spaced concentrically with respect to the core in a manner to provide an air gap underneath the cylinder by unique cap assemblies at each end. Each cap assembly is formed in two separate halves that can be put in position after the cylinder is in position so as to have the capability for a snug fit against the external surface of the core and thereby permit sealing by a suitable adhesive to preserve the air gap. The outer diameter of each assembled end cap is substantially larger than the corresponding dimension of the crystal so as to provide an annular protective bumper at each end of the cylinder. After the electrical conductors are suitably connected to the crystal, a sheath of potting material is placed around the hydrophone area to complete the installation.

The provision of the end caps in separate mating pieces eliminates the need to slip the caps over the cable core and greatly enhances the ease of assembly. The need for shims to secure a seal with the core is also eliminated, thereby reducing manufacturing cost. The formation of bumper surfaces extending beyond the cylinder at each end reduces the possibility of damage during reeling operations or other happenstances.

The present invention has other features and advantages which will become more readily apparent in connection with the following detailed description of a preferred embodiment, taken in conjunction with the accompanying drawings in which:

FIG. 1 is a schematic view showing a marine seismic operation;

FIG. 2 is an enlarged view of a streamer cable section with parts exposed to illustrate detail of a hydrophone assembly; and FIG. 3 is a cross-section taken on line 3—3 of FIG. 2.

Referring initially to FIG. 1, a seismic exploration boat 10 is shown towing a marine streamer cable 11 through the water. The cable 11 can be, and normally is, quite lengthy and is composed of a number of individual sections connected end-to-end with the forward section coupled to the tow boat by a lead-in section. Each live streamer section contains a number of hydrophone assemblies to be described below, the phones being spaced at desired intervals along the cable 11. The hydrophones in each section are connected by a pair of electrical conductors extending along the cable to conventional signal processing and recording equipment onboard the boat 10. The cable 11 is towed normally at a depth of about 40 feet for maximum sensitivity to upcoming pressure waves, and various depth control systems (not shown) are used to maintain the cable at proper depth.

As shown in detail in FIG. 2, the cable 11 is of layered solid construction. The cable core 12 has a center stress member 13 around which is cabled a plurality of twisted pairs of electrical conductors 14, with the matrix filled with a suitable filler compound 15. A neoprene jacket 16 is extruded around the core 12, and a flotation layer 17 is constituted by a special cellular compound that can be foam extruded to appropriate dimensions based on the desired buoyancy. For details of a cellular compound that is particularly suited for this application, reference may be had to U. S. application Ser. No. 105,547, filed Jan. 11, 1971, and assigned to the assignee of this invention. Finally an outer jacket 18 of polyethylene or the like is extruded on the cable to provide a relatively smooth external surface.

The hydrophone assembly indicated generally at 20 includes a crystal 21 in the form of a cylinder that is mounted on the core 12 by end cap assemblies 22 and 23. The crystal 21 is formed of a piezoelectric material such as lead zirconate titanate, and the inner and outer surfaces are silver plated and provided with terminals 24 and 25 that are connected to conductor wires 26 and 27 respectively. As will be appreciated by those skilled in the art, a pressure wave will set up hoop stress in the cylinder, resulting in the production of an output signal. In order for the crystal 21 to respond, it is of course necessary to maintain an air gap or a region of other compressible medium underneath, and for this purpose the inside diameter of the cylinder 21 is greater than the outside diameter of the cable core 12 so that there is lateral separation. This separation is maintained by mounting the cylinder 21 on the cable core 12 by the end cap assemblies 22 and 23.

Referring still to FIG. 2 and additionally to FIG. 3, each end cap assembly has two mating pieces 28 and 29 that when fitted around the core 12 provide an annular configuration. Each piece has an internal bore surface 30 that is sized to fit snugly against the outer surface of the core 12, and one side is stepped to provide a support lip 31 with a cross-sectional dimension sized to fit within the end portion of the cylinder 21. Thus the end cap assemblies rigidly mount the cylinder 21 in concentric relation to the core 12. A suitable adhesive such as epoxy resin is used to seal between the internal bore surfaces 30 and the outer surface of the core 12, as well as between the mating side surfaces 32 and 33 of the cap pieces 28 and 29. Moreover, the adhesive is used to seal the end portions of the cylinder 21 against the end cap assemblies 22 and 23, so that the end result is to provide a sealed and preserved air gap underneath the crystal. The outer diameter of each end cap assembly is somewhat greater than the corresponding dimension of the cylinder 21 to provide an annular bumper portion 34 at each end which serves to protect the cylinder from accidental breakage. A potting material 35 of a suitable elastomeric substance is put over the hydrophone area to build up the diameter to a value near, but less than, the diameter of the flotation layer 17. Preferably, the potting material 35 extends along the cable between points beyond the cut ends of the inner jacket 16, so that the entire hydrophone area is sealed off by the potting material in an appropriate manner.

To assemble the hydrophone assemblies 20, the jacket 16 is cut away for small lengths at each location where a hydrophone assembly is to be stationed. Then the cylinders 21 are slipped over the core and properly located. Next a pair of the electrical conductors inside the core 12 is taken out through a slit 36 and may be wrapped around the core for connection with the cylinder 21, whereupon the conductors are connected to the cylinder terminals 24 and 25 by soldering or the like. The end cap pieces 28 and 29 with adhesive previously applied are positioned together around the core 12 and the support lips 31 are moved underneath the end portions of the cylinder 21. Finally the potting material 35 is applied and allowed to cure. With all of the hydrophone assemblies in position, the cable is fed through an extruder to apply the flotation layer 17 and a final run is made to apply the extruded outer jacket 18.

It will now be apparent that since the end cap assemblies do not have to be slipped onto the cable core as in the prior art, the present invention provides a number of advantages. It is much easier to make the electrical connections since this can be done without the end caps in place. The through bore of each end cap assembly can be dimensioned to fit snugly and seal against the cable core to preserve the air gap inside each cylinder. There is no need for shims or the like to be placed between the end caps and the core. The bumper surfaces of the end caps greatly reduce the possibility of damage to the crystal in use.

Since certain changes or modifications may be made by those skilled in the art without departing from the inventive concepts involved, it is the aim of the appended claims to cover all such changes or modifications falling within the true spirit and scope of the present invention.

We claim:

1. A hydrophone structure adapted to be assembled on a cable core, comprising: a piezoelectric crystal in the form of a cylinder surrounding the cable core, said crystal having a greater internal diameter than the outer diameter of the cable core; and means including cap assemblies at each end of said crystal for mounting said crystal concentrically on the core, each cap assembly having at least two separate members that when fitted together form an annular configuration adapted to be fitted about the core after the crystal is in place, said cap assemblies having internal surfaces fitting snugly against the cable core and having support surfaces engaging end portions of said crystal.

2. The hydrophone structure of claim 1 wherein said members have a greater radius dimension than the crystal to provide protective bumper surfaces at each end of the crystal.

3. The hydrophone structure of claim 2 further including adhesive means sealing the ends of the crystal with respect to the cap assemblies and sealing the mating surfaces of said separate members with respect to each other to enable the preservation of a region of compressive medium interiorly of said crystal.

4. The hydrophone structure of claim 3 further including a layer of potting material surrounding said crystal and formed to a diameter in excess of the diameter of said protective bumper surfaces.

5. A hydrophone structure adapted to be assembled on a cable core, comprising: a piezoelectric crystal in the form of a cylinder having a greater inner diameter than the outer diameter of the cable core so as to be slipped readily onto and along the cable core to a mounting position thereon; and means for mounting said crystal in concentric relation on a cable core including a cap assembly at each end, each cap assembly having at least two separate members that when fitted together form an annular configuration with a stepped surface on one side forming a circular support lip for supporting an end portion of said crystal and a peripheral portion with a diameter in excess of the outer diameter of said crystal to provide protective bumper surfaces for said crystal, the bore of said annular configuration being sized for a close tolerance fit with the cable core.

6. The hydrophone structure of claim 5 further including adhesive means sealing the ends of said crystal with respect to said cap assembly and sealing the abutting surfaces of said separate members to each other to enable the preservation of a region of compressible medium between said crystal and the cable core.

7. The hydrophone structure of claim 6 further including a layer of potting material surrounding said crystal and extending along the cable core between points beyond said cap assemblies.

* * * * *